United States Patent
Husemann et al.

(10) Patent No.: US 7,510,764 B2
(45) Date of Patent: *Mar. 31, 2009

(54) LOW-OUTGASSING ACRYLIC PRESSURE-SENSITIVE ADHESIVE COMPOSITIONS

(75) Inventors: Marc Husemann, Hamburg (DE); Stephan Zöllner, Hamburg (DE); Heiko Thiede, München (DE); Reinhard Storbeck, Hamburg (DE)

(73) Assignee: tesa AG, Hamburg (DE)

( * ) Notice: Subject to any disclaimer, the term of this patent is extended or adjusted under 35 U.S.C. 154(b) by 815 days.

This patent is subject to a terminal disclaimer.

(21) Appl. No.: 10/077,658

(22) Filed: Feb. 15, 2002

(65) Prior Publication Data

US 2002/0168517 A1 Nov. 14, 2002

(30) Foreign Application Priority Data

Feb. 24, 2001 (DE) ................................ 101 09 066

(51) Int. Cl.
*B32B 7/10* (2006.01)
(52) U.S. Cl. ................................ 428/345; 428/355 AC; 442/151; 525/78; 525/80; 525/87; 522/1
(58) Field of Classification Search ................. 428/343, 428/345, 355 AC; 442/151; 525/78, 80, 525/82; 522/1
See application file for complete search history.

(56) References Cited

U.S. PATENT DOCUMENTS

| 5,073,611 | A | 12/1991 | Rehmer et al. .............. 526/208 |
| 5,100,728 | A | 3/1992 | Plamthottam et al. ....... 428/345 |
| 5,681,654 | A | 10/1997 | Mamish et al. ............. 428/354 |
| 5,761,184 | A | 6/1998 | Dauber et al. ............... 369/247 |
| 5,772,851 | A | 6/1998 | Barwich et al. .............. 203/49 |
| 6,242,504 | B1 * | 6/2001 | Meyer-Roscher et al. ...... 522/2 |
| 6,878,775 | B2 * | 4/2005 | Husemann et al. ............ 525/78 |

FOREIGN PATENT DOCUMENTS

| DE | 43 13 008 C1 | 11/1994 |
| DE | 43 40 136 A1 | 6/1995 |
| DE | 198 07 752 A1 | 8/1999 |
| EP | 0 621 326 B1 | 10/1994 |
| EP | 0 655 465 A1 | 5/1995 |
| WO | WO 97/45184 | 12/1997 |

OTHER PUBLICATIONS

English-language counterpart to EP 0 621 326 B1 and DE 43 13 008 C1 (Specification—U.S. Appl. No. 08/320,355, filed Apr. 20, 1994).
English-language counterpart to DE 198 07 752 A1 (Specification—U.S. Appl. No. 09/253,213, filed Feb. 19, 1999).
Database WPI, Section Ch, Week 199941, Derwent Publications Ltd., London, GB; AN 1999-489022 XP002260194 and JP 11 209725 A (Nitto Denko Corp) Aug. 3, 1999.

* cited by examiner

*Primary Examiner*—Elizabeth M Cole
(74) *Attorney, Agent, or Firm*—Norris, McLaughlin & Marcus; William C. Gerstenzang

(57) ABSTRACT

A pressure-sensitive adhesive composition comprising polymers and/or copolymers based at least predominantly on (meth)acrylic acid and/or derivatives thereof, wherein said composition possesses an outgassing level of not more than 50 µg/g in total, preferably less than 10 µg/g, when said composition is measured by the tesa method.

12 Claims, No Drawings

LOW-OUTGASSING ACRYLIC PRESSURE-SENSITIVE ADHESIVE COMPOSITIONS

The invention relates to a process for preparing and processing a low-outgassing acrylic pressure-sensitive adhesive composition, to such a pressure-sensitive adhesive composition, and to an adhesive tape comprising such a pressure-sensitive adhesive composition.

BACKGROUND OF THE INVENTION

In the industry, hotmelt processes employing solvent-free coating technology are of growing importance for the preparation of pressure-sensitive adhesive (PSA) compositions. Generally speaking, environmental regulations and rising costs are pushing forward this development process. As well as SIS (styrene-isoprene-styrene copolymer) systems, acrylic polymers are increasingly being applied from the melt as a polymer film to backing materials. Moreover, for specialty applications, there is a need for PSA tapes having very low outgassing characteristics. Such characteristics can be ensured only by means of hotmelt processes, since conventional coatings applied from a solution always contain small residual solvent fractions.

The hotmelt process commonly starts with a solution polymerization followed by a concentration process in which the solvent is removed. A variety of techniques are known for doing this.

The switch to hotmelt processes imposes particular requirements in respect of a downstream crosslinking procedure. Thus, for example, thermal crosslinking techniques using metal chelates or polyfunctional isocyanates, which are widespread with the solvent systems, can no longer be employed. At the present time, therefore, the crosslinking of polyacrylate PSA compositions is forced by exposure to ultraviolet light (UV) or electron beams (EB), the latter being known as electron beam curing (EBC).

For the production of acrylic PSA tapes with low outgassing characteristics, UV crosslinking is preferential. EB crosslinking is a random process which as well as actually crosslinking the polymer chains produces fragments which remain in the PSA tape and may subsequently outgas when the bond is exposed to temperature.

Generally speaking, UV crosslinking is a process which does not involve very complex apparatus, needing only a simple coating unit with a few low-pressure Hg lamps. UV crosslinking operates very effectively for polyacrylate compositions with film thickness up to 100 g/m$^2$. The EBC technology, in contrast, is significantly more complicated.

For industrial applications, especially in the electronics sector, temperature-stable, shearing-resistant acrylic PSA tapes with very low outgassing are required. Residues of solvent and residual monomer may evaporate out during application at elevated temperatures, with the consequence that the atmosphere may contain solvent. This can give rise to a variety of problems. One is that certain monomers possess good conductivity, so that the risk of short circuits increases. Another is that the solvents and/or monomers may bring about the destruction of plastic parts and insulators. In this sector, therefore, attempts are made to use very high-purity acrylic PSA tapes which possess extremely low outgassing tendencies.

The U.S. Pat. No. 5,681,654 has already described a pressure-sensitive adhesive composition having very low outgassing (fogging) characteristics. This PSA composition, however, was created specifically for applications in automaking, where relatively high levels of outgassing are tolerated. Moreover, this patent describes not acrylic PSA compositions but rather rubber adhesive compositions. These elastomers have a number of fundamental disadvantages relative to polyacrylates, such as, for example, the lower thermal shearing resistance and the tendency to age by oxidation of the double bonds present. Since in the electronics sector it is often possible for ozone to form (in copiers, for example), the rubber adhesive compositions specifically are completely unsuitable for such a use.

The U.S. Pat. No. 5,761,184 described vibration-damping materials which likewise possess little tendency to outgas. The limit of tolerable outgassing, however, was not defined. Furthermore, for application of the damping material, a double-sided acrylic PSA tape was used. Here again, there was no more detailed characterization of the PSA tape nor investigation of the outgassing characteristics of the assembly.

DE 198 07 752 A1 introduces a nonfogging adhesive tape, fogging referring to the condensation of evaporated volatile components from the automotive interior trim on the windows. This self-adhesive tape comprises a nonfogging backing on at least one side of which a nonfogging PSA composition has been applied. The adhesive composition used is preferably one based on an acrylic hotmelt. For the residual solvent content, a preferred limit of at most 1% by weight is stated.

In addition to the abovementioned removal of the solvent from the polymerization process, therefore, for specific application of the polyacrylate composition produced it is necessary to conduct a postpurification in which not only remaining solvent residues but also residual monomer residues are removed. This postpurification process may be conducted in conjunction with the actual concentration process.

One proposal for a postpurification is given by DE 43 40 136 A1. That document describes a process in which the removal of the solvent takes place under reduced pressure and, toward the end of the distillation, entrainers such as steam, nitrogen, argon, and $CO_2$ are supplied at temperatures of more than 100° C. For this process, however, it is necessary to pump the system in circulation in order to optimize polymer mixing. A disadvantage of this process is that the pump circulation procedure places limits on the viscosity of the solution to be concentrated, thereby making it impossible to prepare end products of relatively high viscosity.

BASF has developed a relatively low molecular mass acrylic hotmelt possessing a UV crosslinking mechanism [U.S. Pat. No. 5,073,611]. The copolymerized benzophenone photoinitiator is a type II photoinitiator, which does not release fragments under UV exposure and thus during crosslinking. These pressure-sensitive adhesive compositions possess little outgassing tendency. Nevertheless, owing to the concentration process, the residual monomer fraction is still too high and is situated above a preferred limit of 10 µg/g adhesive composition.

DE 43 13 008 A1 and EP 621 326 B1 describe the use of an extruder to concentrate a self-adhesive composition based on acrylic hotmelt. In this case an extruder is used to concentrate or devolatilize a self-adhesive composition of this kind having a K value of at least 60, to give a system which can be processed as a hotmelt for a plaster or for an industrial adhesive tape. In one preferred embodiment of the invention, furthermore, the residual solvent content is said to fall below 1% by weight.

It is an object of the invention to provide a pressure-sensitive adhesive composition, particularly for application in the electrical and electronics sectors, which does not have the disadvantages of the prior art. In particular, for pressure-sensitive adhesive compositions used in such applications, the intention is to reduce the presence of monomers and fragments which may lead to short circuits and the like.

Surprisingly and unforeseeably, pressure-sensitive adhesive compositions with significantly reduced outgassing characteristics have been prepared for the first time; consequently, these compositions are outstandingly suitable for use in this field of application.

SUMMARY OF THE INVENTION

It has surprisingly been found that pressure-sensitive adhesive compositions, including those based on relatively high-viscosity polyacrylates, may be prepared with a residual volatile component fraction of in total less than 50 μg/g, and in an improved embodiment even below 10 μg/g (corresponding to 10 ppm), if the preparation process includes a concentration process wherein concentration is conducted directly in an extruder by means of a corresponding distillation process in which entrainers are added. By this means, even polymers of relatively high viscosity can be purified. Advantageously, the pressure-sensitive adhesive composition is crosslinked by means of gentle UV-A radiation.

The invention accordingly provides a pressure-sensitive adhesive composition comprising polymers and/or copolymers based at least predominantly on (meth)acrylic acid or derivatives thereof and possessing an outgassing level of less than 50 μg/g in total, preferably less than 10 μg/g, based on the weight of the pressure-sensitive adhesive composition. The outgassing level is measured by the technique referred to in the experimental section as the tesa method.

DETAILED DESCRIPTION

In a first highly advantageous embodiment, the pressure-sensitive adhesive composition is a UV-crosslinkable or a UV-crosslinked copolymer prepared using at least the following monomers:

from 65 to 100% by weight of acrylic and/or methacrylic acid derivatives of the general formula

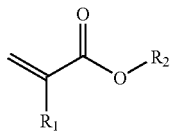

where $R_1$=H or $CH_3$ and $R_2$=an alkyl chain of 2 to 20 carbon atoms, and from 0 to 35% by weight of vinyl compounds containing functional groups.

As vinyl compounds containing functional groups it is preferred to use acrylic acid, methacrylic acid, maleic acid, fumaric acid, itaconic acid, maleic anhydride, styrene and styrenic compounds, vinyl esters, especially vinyl acetate, vinyl alcohols, vinyl ethers, acrylamides, and type II photoinitiators functionalized with double bonds, although this list should not be interpreted as being conclusive.

The invention further provides a process for preparing a pressure-sensitive adhesive composition as described above. This process uses a polyacrylate solution obtainable by free-radical addition polymerization. After polymerization, an entrainer is added to the polyacrylate solution and the entrainer-admixed polyacrylate solution is passed into an extruder in which said solution is subjected to a carrier distillation. The concentration thus produces a polyacrylate composition which is processed further from the melt.

To prepare the polyacrylate solution which is intended for concentration, a free or controlled free-radical addition polymerization is conducted. The free-radical polymerization may be conducted in the presence of an organic solvent or in water or in mixtures of organic solvents, and also in mixtures of organic solvents with water. It is preferred to minimize the amount of solvent used. Depending on conversion and temperature, the polymerization time is between 6 and 48 h. The average molecular weight of the polymers varies between 300 000 and 2 000 000 g/mol, more preferably between 600 000 and 1 200 000 g/mol.

Solvents used for the solution polymerization are preferably esters of saturated carboxylic acids (such as ethyl acetate), aliphatic hydrocarbons (such as n-hexane or n-heptane), ketones (such as acetone or methyl ethyl ketone), special boiling point spirit, or mixtures of these solvents. It is very preferred to use an acetone/isopropanol solvent mixture with an isopropanol content of between 1 and 10 percent by weight. Polymerization initiators used comprise customary radical-forming compounds, such as peroxides and azo compounds, for example. Initiator mixtures may also be used. In the course of the polymerization, it is also possible to use thiols as further regulators for lowering molecular weight and reducing the polydispersity. As further polymerization regulators, as they are known, it is possible to use, for example, alcohols and ethers.

The polymerization for preparing the polyacrylate solution may be conducted in polymerization reactors, which are generally provided with a stirrer, a number of feed vessels, a reflux condenser, heating, and cooling, and are equipped for operation under an $N_2$ atmosphere and superatmospheric pressure.

In the process of the invention the solvent is removed under reduced pressure in a concentration extruder in which, preferably, the solvent is distilled off in different vacuum stages. The function of the entrainer is to carry off solvents, impurities, and volatile components.

In one improved variant of the inventive process, in at least one further step following concentration, a postpurification is conducted by adding the same entrainer again, or a further entrainer, to the concentrated polyacrylate composition and carrying out a further carrier distillation in the extruder, preferably choosing in each case higher temperatures and lower vacuums than in the preceding distillation step. Again, solvents, residual monomer residues, and impurities are removed.

The extruder in the concentration step is preferably a corotating or counterrotating twin-screw extruder. The concentration and postpurification steps may be conducted in a single extruder or in a series of extruders. Where two or more extruders are used, it is advantageous to use twin screw extruders for the postpurification steps as well, selectable again between corotating and counterrotating.

In one outstanding procedure, steam may be used as the entrainer for distillation in the inventive process. Also suitable, however, are organic entrainers familiar to the skilled worker for carrier distillation.

In steam distillation, the steam acts as a carrier for the more or less volatile substances which are to be removed from the pressure-sensitive adhesive composition. Even many high-boiling substances possessing little or no miscibility with water can be distilled off in this way at temperatures as low as about 100° C. if they are heated together with water or if hot steam is passed through during the distillation.

One variant with which the steam distillation may be operated for removing relatively high-boiling components is that of distillation with superheated steam (at temperatures of about 130° C.).

Only by means of the inventive process, in particular by an appropriate combination of concentration and postpurification, is it possible to obtain the inventive pressure-sensitive adhesive composition having the required outgassing levels.

The polyacrylate compositions may have been blended with one or more additives such as aging inhibitors, light stabilizers, and ozone protectants; the moment of admixing these or any other additives may be chosen favorably in accordance with the process steps. For instance, components which would not withstand the concentration process are preferably admixed subsequently.

Moreover, the polyacrylate compositions may have been filled with one or more fillers such as fibers, carbon black, zinc oxide, titanium dioxide, solid microbeads, silica, silicates, and chalk, and the addition of blocking-free isocyanates is also possible.

For the inventive process it is advantageous to append a process step in which the concentrated polyacrylate composition which has, if desired and advantageously, been postpurified is applied to a backing material. In an advantageous procedure, this application takes place from the melt. Particularly for the subsequent use of the polyacrylate composition as a pressure-sensitive adhesive composition, particularly as one for pressure-sensitive adhesive tapes, it is an advantage to subject the polyacrylate composition on the backing material to a crosslinking reaction.

For this purpose it is advantageous to blend the polyacrylate solution following polymerization, or the polyacrylate composition following the concentration step, with crosslinkers.

Suitable crosslinker substances in this context are difunctional or polyfunctional acrylates, difunctional or polyfunctional isocyanates, or difunctional or polyfunctional epoxides. Use may also be made here, however, of any further difunctional or polyfunctional compounds, familiar to the skilled worker, which are capable of crosslinking polyacrylates.

In a further development of this process, following the distillation but before crosslinking, the polyacrylate composition is laminated or applied directly from the melt, i.e., as a hotmelt composition, to one or both sides of a backing material, which may advantageously be composed of films (PP, BOPP, PET, PVC, polyester, etc.), wovens (e.g., cotton, viscose, viscose acetate, rayon staple), nonwovens (of viscose or polyester, for example), felts, foams or foam materials, or release paper (glassine, HDPE, LDPE), said backing material preferably possessing a very low outgassing level (less than 3 μg/g); as one example, mention may be made here of the PET already mentioned above. The polyacrylate composition is then crosslinked, preferably, directly on the backing material.

Crosslinking of the polyacrylate compositions in the inventive process takes place by exposure to UV light in a wavelength range of preferably from 250 to 400 nm, with the highest emission density being in the range above 300 nm. The proviso here should be that the output of light in the wavelength range from 300 to 400 nm makes up at least 70%, very preferably 90%, of the total irradiated light output.

Advantageously, irradiation is carried out for a short time with the light from standard commercial high-pressure or medium-pressure mercury lamps having an output of, for example, from 80 to 400 W/cm. In order to prevent damage to the adhesive composition and in order not to produce any additional components capable of outgassing, hard UV radiation in a wavelength range of less than 250 nm is filtered out. The predominant use of soft UV-A radiation leads to a high crosslinking yield under gentle conditions. Additionally, the polyacrylate composition to be crosslinked may be covered with a siliconized sheet which absorbs the hard wavelength range. At the same time this measure excludes the effect of atmospheric oxygen.

Here, or as an alternative, a UV emitter is used at least 70%, very preferably 90%, of whose emission is in a wavelength range from 300 to 400 nm, preferably from 320 to 400 nm, i.e., in the UV-A range. Emission devices of UV instruments of this kind are, for example, the F15T8-BLB bulbs from Sylvania or the Sunlamp Performance 40W-R from Philips. The fraction of the wavelength range from 250 to 320 nm is therefore minimized. It is also possible to use doped glass in order to lower the exposure of the pressure-sensitive adhesive composition to radiation within this wavelength range through the filter effect of the glass.

For UV crosslinking it may be appropriate to adapt the lamp output to the belt speed at which the coated backing material is passed through the radiation area or, at a low belt advance speed, to shade the belt partially, in order to reduce the thermal load. The period of irradiation is guided by the construction and output of the respective emission devices.

Furthermore, the PSA tape produced in this way may optionally be heated for a short time. The heat may be introduced by irradiation, e.g., with UV, IR or microwaves. The irradiating devices are advantageously coupled to a suction removal apparatus. The PSA composition is preferably heated by IR radiation in the wavelength range around $1700 cm^{-1}$, with the temperature of the PSA composition being at least 100° C., preferably 120° C. or more, but not exceeding an upper limit of 170° C.

A further component of the invention is the use of a pressure-sensitive adhesive composition as described above or of a pressure-sensitive adhesive composition obtainable by one of the above-described processes for an adhesive tape, particularly for application in the electronics industry. Claimed in particular is an adhesive tape comprising a film, applied to one or both sides of a backing material, of a pressure-sensitive adhesive composition having an outgassing level of less than 50 μg/g in total, preferably less than 10 μg/g, based on the weight of the pressure-sensitive adhesive composition.

An adhesive tape in which the backing material possesses a very low outgassing tendency, preferably of less than 5 μg/g, measured under the abovementioned conditions for the outgassing measurements, is a particularly advantageous development of the inventive adhesive tape. More preferably still, backing materials outgassing less than 3 μg/g are used.

The series of tests depicted below are intended to illustrate the invention, without the choice of examples being intended to impose any unnecessary restriction.

EXAMPLES

Test methods

Measuring the Outgassing Level (Tesa Method):

Preparing the Samples:

The adhesive compositions were coated onto PET film by the hotmelt process. The application rate was approximately 50 g/m². Before or after UV exposure, an area measuring about 40 cm² was cut from the sheet sample, scattered with glass beads (diameter: 60 to 80 μm), rolled up, and transferred to a 25 ml glass headspace vessel. The sample was baked out at 100° C. at atmospheric pressure for 1 h and, finally, the volatile constituents from the vapor space were injected into the GC.

Analysis:

The volatile constituents were determined by GC-MS. The instruments used were as follows:
GC: Hewlett Packard HP 5890 SERIES II
MS: Hewlett Packard HP 5080 A For the measurement, a DB-5 column was installed with a length of 60 m, an internal diameter of 0.25 mm, and a film thickness of 1 μm. Measurement was carried out using the following temperature program: 50° C. (3 min.)-15° C./min-260° C. (2 min.). The carrier gas used was hydrogen (90 kPa) at a flow rate of 1 ml/min. The split ratio was 1:10.

The peaks in the GC were quantified against external standards.

Determining the Gel Fraction

The carefully dried, solvent-free adhesive samples are welded into a pouch of polyethylene nonwoven (Tyvek nonwoven). From the difference in sample weights before and after extraction with toluene, the gel value is determined, as the percentage weight fraction of the polymer that is insoluble in toluene.

Results

Commercially available pressure-sensitive adhesive tapes all possess a high outgassing rate. Even pressure-sensitive adhesive tapes which have been crosslinked thermally still always possess unsatisfactory outgassing characteristics. In the text below, the UV-AC Resins™ (BASF AG), which have been praised for their low outgassing characteristics, are compared with one another.

Example 1

UV-AC Resin 203™ (BASF AG) was applied using a hotmelt coater to a PET backing at a rate of 100 g/m² and then the outgassing characteristics were determined by the above method.

Example 2

UV-AC Resin 203™ (BASF AG) was applied using a hotmelt coater to a PET backing at a rate of 100 g/m² and then irradiated once at 10 m/min using a UV unit from Eltosch (medium-pressure mercury lamp, 120 W/cm, full output). Thereafter, the outgassing characteristics were determined.

Example 3

UV-AC Resin 203™ (BASF AG) was applied using a hotmelt coater to a PET backing at a rate of 100 g/m² and then irradiated 4 times at 10 m/min using a UV unit from Eltosch (medium-pressure mercury lamp, 120 W/cm, full output). Thereafter, the outgassing characteristics were determined.

Example 4

UV-AC Resin 203™ (BASF AG) was placed in a 3-neck flask and steam was passed through for 2 h The purified hotmelt was then in turn applied using a hotmelt coater to a PET film at a rate of 100 g/m², and the outgassing characteristics were determined.

Example 5

The procedure of example 4 was repeated. The adhesive tape was irradiated once at 10 m/min using a UV unit from Eltosch (medium-pressure mercury lamp, 120 W/cm, full output). Thereafter, the outgassing characteristics were determined.

Example 6

UV-AC Resin 203™ (BASF AG) was introduced together with steam into a Werner und Pfleiderer ZSK 30 twin-screw concentrating extruder with a concentration temperature of 70° C. The water/impurities mixture was stripped off over three different vacuum stages. The purified hotmelt was then in turn applied using a hotmelt coater to a PET film at a rate of 100 g/m², and the outgassing characteristics were determined.

Example 7

A pressure-sensitive adhesive composition prepared as in example 6 was applied using a coat hanger die from EDI to a PET backing at a rate of 100 g/m². A sample was then irradiated for 2 minutes with 4 Philips Sunlamp Performance 40 W-R bulbs.

Results

The outgassing results are summarized in table 2:

TABLE 2

| Example | Volatiles [μg/g] | Gel level |
|---|---|---|
| 1 | 150 | 0 |
| 2 | 210 | 20 |
| 3 | 400 | 66 |
| 4 | 5 | 0 |
| 5 | 61 | 17 |
| 6 | 3 | 0 |
| 7 | 9 | 60 |

The results show that the UV-AC Resins™, praised for their low outgassing characteristics, still contain very large amounts of volatiles. If the UV-AC Resin 203™ is used for hotmelt coating and is subsequently crosslinked with conventional UV light, the pressure-sensitive adhesive tape as a whole still possesses volatile constituents at between 210 and 400 μg/g adhesive composition. Volatile constituents detected were the following compounds:

acetone, 2-methylpentane, 3-methylpentane, hexane, ethyl acetate, 2-methyl-1-propanol, 1-butanol, 2,4-dimethylpentane, cyclohexane, 3-methylhexane, 1,2-dimethylcyclopentane, heptane, methylcyclohexane, toluene, 3-methylheptane, ethylbenzene, p-xylene, butyl 2-propanoate, 1,3-dimethylbenzene, benzene, butyl formate, butanal and isobutene.

The amounts measured are clearly too great for applications in the electrical or electronics industries. In contrast, the UV-AC Resin™ additionally purified with steam exhibits significantly lower outgassing characteristics. Visually as well, the pressure-sensitive adhesive composition loses its inherent yellow coloration and is water-clear and transparent.

In order to obtain a pressure-sensitive adhesive tape with low outgassing characteristics, crosslinking must be effected gently. For this purpose it is preferred to carry out UV crosslinking using a UV-A lamp. If this is not done (example 5) then the hard UV-C radiation damages the acrylic pressure-sensitive adhesive composition and fragments are produced, such as n-butanol and n-butanal, for example (example 5).

In order to obtain a pressure-sensitive adhesive tape having outgassing characteristics corresponding to less than 10 μg/g, it is necessary not only to carry out steam distillation to purify the base hotmelt but also to carry out selective irradiation and crosslinking with UV-A light (example 6).

An advantage of the present invention is that a pressure-sensitive adhesive composition is provided whose very low outgassing characteristics do not rise significantly even after a crosslinking process, and which therefore offers considerable advantages for application. The outgassing characteristics of pressure-sensitive adhesive compositions concentrated by conventional methods increase considerably again when they are crosslinked by irradiation with the standard, unfiltered mercury lamps, as is also shown, by examples 4 and 5. The tolerable limit is exceeded again. The inventive process now makes it possible for the first time to offer corresponding, low-outgassing, crosslinked pressure-sensitive adhesive compositions. By means of carrier gas distillation in an extruder it is also possible to concentrate polyacrylate solutions which lead to polyacrylate compositions of relatively high viscosity. A process which includes a pump circulation procedure does not lead to these results.

By means of the advantageously chosen monomer compositions, the stressing of the polyacrylate compositions in the extruder is low. Where, for example, polymers having molecular weights of approximately 1 million ($M_w \approx 1\,000\,000$ g/mol) are used, the molecular weight reduction in the extruder is only up to 5%.

What is claimed is:

1. A UV crosslinked pressure-sensitive adhesive composition comprising polymers, copolymers, or both, based at least predominantly on (meth)acrylic acid, derivatives thereof, or both, wherein said crosslinked pressure-sensitive adhesive composition comprises a residual volatile component fraction of in total less than 50 µg/g, as measured by the tesa method.

2. The UV crosslinked pressure-sensitive adhesive composition as claimed in claim 1, wherein the polymers, copolymers or both are prepared using at least the following monomers:

(a) from 65 to 100% by weight of acrylic acid derivatives, methacrylic acid derivatives, or both, of the general formula

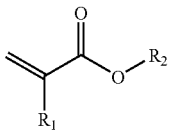

where $R_1$=H or $CH_3$ and $R_2$=an alkyl chain of 2 to 20 carbon atoms, (b) from 0 to 35% by weight of vinyl compounds containing functional groups.

3. A process for preparing a UV crosslinked pressure-sensitive adhesive composition as claimed in claim 1, using a polyacrylate solution obtainable by free-radical addition polymerization, which comprises a concentration step in which
after polymerization, an entrainer is added to the polyacrylate solution,
the entrainer-admixed polyacrylate solution is passed into an extruder in which said solution is subjected to a carrier distillation,
in at least one further step following concentration, a post-purification step is conducted by adding the same entrainer again, or a further entrainer, to the concentrated polyacrylate composition and carrying out a further carrier distillation in the extruder,
the concentration thus produces a polyacrylate composition which is processed further from the melt, and
the polyacrylate composition is crosslinked by exposure to UV-A radiation.

4. The processes claimed in claim 3, wherein at least the extruder in the concentration step is a corotating or counter-rotating twin-screw extruder.

5. The process as claimed in claim 3, wherein steam is used as entrainer.

6. The process as claimed in claim 3, wherein
the concentrated polyacrylate composition is applied to a backing material
and the polyacrylate composition on the backing material is subjected to a crosslinking reaction.

7. The process as claimed in claim 6, wherein crosslinking is carried out using UV light in a wavelength range from 250 to 400 nm, with the proviso that the output of light in the wavelength range from 300 to 400 nm makes up at least 70% of the total irradiated light output.

8. An adhesive tape comprising a backing material having a UV crosslinked pressure-sensitive adhesive composition as claimed in claim 1 or 2 applied to one or both sides.

9. The adhesive tape as claimed in claim 8, comprising a backing material having en outgassing tendency of less than 5 µg/g.

10. The UV crosslinked pressure-sensitive adhesive composition of claim 1, wherein said volatile component fraction is less than 10 µg/g.

11. The process of claim 3, wherein said further carrier distillation is conducted at higher temperatures and lower vacuums than the preceding distillation.

12. The process of claim 7, wherein the light in the wavelength range of 300 to 400 nm makes up at least 90% of the total irradiated light output.

* * * * *

UNITED STATES PATENT AND TRADEMARK OFFICE
CERTIFICATE OF CORRECTION

PATENT NO. : 7,510,764 B2
APPLICATION NO. : 10/077658
DATED : March 31, 2009
INVENTOR(S) : Husemann et al.

Page 1 of 1

It is certified that error appears in the above-identified patent and that said Letters Patent is hereby corrected as shown below:

Column 7, line 8, "HP 5080 A" should read -- HP 5989 A --.

Signed and Sealed this

Twenty-ninth Day of June, 2010

David J. Kappos
*Director of the United States Patent and Trademark Office*